(12) United States Patent
Haas et al.

(10) Patent No.: US 7,989,516 B2
(45) Date of Patent: Aug. 2, 2011

(54) PLASTIC COMPOSITE ELEMENTS AND A PROCESS FOR THE PRODUCTION THEREOF

(75) Inventors: Peter Haas, Haan (DE); Catherine Lövenich, Bergisch-Gladbach (DE); Hartwig Grammes, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 779 days.

(21) Appl. No.: 11/982,960

(22) Filed: Nov. 6, 2007

(65) Prior Publication Data

US 2008/0113185 A1    May 15, 2008

(30) Foreign Application Priority Data

Nov. 10, 2006    (DE) .......................... 10 2006 052 987

(51) Int. Cl.
*B32B 27/40*    (2006.01)
*C08G 18/28*    (2006.01)

(52) U.S. Cl. .................. 521/165; 428/423.1; 428/423.3; 428/424.6; 428/424.7; 428/424.8; 521/159; 521/170; 521/172

(58) Field of Classification Search ................... 521/159, 521/165, 170, 172; 428/423.1, 423.3, 424.6, 428/424.7, 424.8
See application file for complete search history.

(56) References Cited

U.S. PATENT DOCUMENTS

| | | | | |
|---|---|---|---|---|
| 3,428,578 | A * | 2/1969 | Merten et al. | 521/165 |
| 7,273,656 | B2 | 9/2007 | Haas et al. | 428/423.1 |
| 2006/0057395 | A1 | 3/2006 | Haas et al. | 428/423.1 |

FOREIGN PATENT DOCUMENTS

| | | |
|---|---|---|
| DE | 100 22 280 A1 | 11/2001 |
| EP | 1531173 | 5/2005 |
| GB | 1279894 | 6/1972 |

* cited by examiner

*Primary Examiner* — John Cooney
(74) *Attorney, Agent, or Firm* — Connolly Bove Lodge & Hutz LLP

(57) ABSTRACT

The present invention relates to composite elements containing, as a layer, at least one thermoplastic polymer, adhering to which, as a layer, a polyisocyanate polyaddition product is attached, and a process for the production thereof.

15 Claims, No Drawings

PLASTIC COMPOSITE ELEMENTS AND A PROCESS FOR THE PRODUCTION THEREOF

FIELD OF THE INVENTION

The invention relates to composite elements comprising a thermoplastic polymer layer and a polyurethane layer, a process for the production thereof and the use thereof.

BACKGROUND OF THE INVENTION

Polyisocyanate polyaddition products obtainable by reaction of isocyanates with compounds that are reactive towards isocyanates, e.g. polyols, i.e. compounds having at least two hydroxyl groups, as well as composite elements of these products with other plastics, are generally known. Stressing of these composite elements by high temperatures and humidities often leads to an undesirable separation of the plastics from the polyisocyanate polyaddition products. Particularly when these composite elements are used in automotive construction, for which stressing of this type cannot be ruled out, separation of the polyisocyanate polyaddition products from the other plastics, and thus destruction of the composite element, is unacceptable.

In the production of the composite elements, and particularly of the polyisocyanate polyaddition products, the problem can occur that the starting components, particularly the polyol component, which contains the starting materials that are reactive towards isocyanates, do not give stable mixtures. Precisely at low temperatures, e.g. lower than 20° C., individual polyols may tend to flocculate in the polyol component or to precipitate in the polyol component. It is important to avoid this problem, precisely for the reproducible production of high-quality products.

DE-A 10 022 280 describes a process for the production of composite elements with improved adhesion and humid ageing properties of such composite materials comprising thermoplastics and polyurethanes. The composite is used e.g. to produce instrument panels, these panels conventionally being constructed e.g. of a thermoplastic support, a polyurethane ("PUR") foam and an additional outer layer of e.g. polyvinyl chloride ("PVC"), thermoplastic polyolefin ("TPO"), acrylonitrile butadiene styrene ("ABS"), thermoplastic polyurethanes, sprayed polyurethane skins etc.

By using isocyanate-polyester prepolymers containing ester groups for the production of polyurethane foams according to DE-A 10 022 280, improved properties are obtained, in particular good adhesion between the thermoplastic and polyurethane foams of this type. When such a composite is stored in humid conditions for up to 80 hours at 80° C. and 80% relative humidity, the composite of thermoplastic and polyurethane foam is intact. After that, however, the composite separates.

Another method of producing composites is shown in EP-A 1 531 173, in which isocyanate-polycarbonate prepolymers are described for the production of polyurethane foams with improved adhesion to other thermoplastics during humid ageing. These polyesters or polycarbonates, which substantially improve the adhesion of PUR foams to thermoplastic supports, have to be used on the isocyanate side as the solubility of these components in the polyether polyols to be used with them is very limited.

SUMMARY OF THE INVENTION

The present invention therefore relates to composite elements which can be used e.g. in automotive construction owing to their excellent mechanical properties, and in which the adhesion between the plastic and the polyisocyanate polyaddition products adhering thereto is not lost even during prolonged storage as in the "alternating climatic test" or "blooming test" test methods. In particular, the inventive composite elements are produced with starting components that give stable mixtures and can therefore be used simply and reproducibly without the occurrence of e.g. flocculation and similar separations.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention uses isocyanate prepolymers containing phosphoric acid ester groups to produce polyurethane foams. Surprisingly, it was possible to improve the adhesion between PUR foam and thermoplastic as a result, even under the severe conditions of humid storage with a long period of stress and prolonged stress cycles at alternating temperatures. This is all the more surprising as phosphoric acid ester groups are regarded as being sensitive to hydrolysis. In addition, owing to their good solubility in polyether polyols, these phosphoric acid esters can surprisingly also be used on the polyol formulation side, which also results in a good adhesion effect on the thermoplastic.

The present invention therefore provides composite elements containing, as a layer,
i) a thermoplastic polymer, adhering to which, as a layer,
ii) the product of the reaction of a reaction mixture containing
  a) an isocyanate selected from the group consisting of (i) prepolymers containing isocyanate groups obtainable from the reaction of at least one isocyanate and at least one phosphoric acid triester, in which at least one of the three ester groups is a hydroxyfunctional alkoxylate, the prepolymer having an isocyanate group content of 5 to 45%, and (ii) organic diisocyanates,
  b) in the case of the use of a) (i) compounds reactive towards isocyanates or in the case of the use of a) (ii) a mixture of compounds reactive towards isocyanates and at least one phosphoric acid triester in which at least one of the three ester groups is a hydroxyfunctional alkoxylate, and optionally
  c) catalysts
  d) blowing agents
  e) auxiliary substances and/or additives
is attached.

The composite element according to the invention can contain an additional layer iii) of a thermoplastic polymer, which is attached to the layer ii). This layer iii) preferably acts as a decorative layer.

The composite elements according to the invention can contain conventional thermoplastic polymers as the thermoplastic polymer layer (i), such as e.g. polyphenylene oxide (PPO), polyvinyl chloride (PVC), styrene maleic anhydride (SMA), acrylonitrile-butadiene-styrene-acrylate (ASA), polycarbonate (PC), thermoplastic polyurethane (TPU), polyethylene, polypropylene, thermoplastic polyolefin (TPO) and polycarbonate/styrene-acrylonitrile-butadiene (PC/ABS blend). This layer (i) preferably has a thickness of 0.2 to 5 mm, more preferably 0.2 to 3 mm.

The additional optional thermoplastic polymer layer (iii) contains as plastic e.g. PVC, ASA, SMA, TPU, polyethylene, polypropylene, PC/ABS or TPO. This layer preferably has a thickness of 0.1 to 1.5 mm. It can preferably be used in the form of a plastic film. Films of this type are commercially available and their production is generally known. The films can also be made of several plastics layers (multi-layer films), one layer containing an ASA plastic and one layer a polycarbonate plastic, for example.

According to the invention, the layer of polyisocyanate polyaddition products (ii), e.g. polyurethanes, which can optionally contain isocyanurate and/or urea structures, is adhesively attached to the plastics layer (i). The production of these polyisocyanate polyaddition products, preferably polyurethanes, which can be present in solid or preferably cellular form, e.g. as flexible foam, semi-rigid foam or rigid foam, particularly preferably as semi-rigid foam, takes place in a conventional, generally known manner.

The following compounds can be mentioned as examples of starting compounds for the phosphoric acid triesters used in ii) a) and b):

Dibutyl phosphate, bis(2-ethylhexyl)phosphate, dioctyl phosphate, biscyclohexyl phosphate.

These are converted to the phosphoric acid triesters by alkoxylation with oxiranes, such as e.g. propylene oxide and ethylene oxide. Preferred alkoxylating agents are methyl oxirane, ethylene oxide and ethyl oxirane.

The following can be mentioned as an example of a reaction equation:

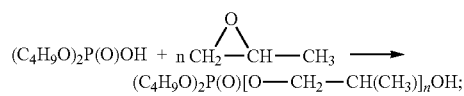

n = 1 to 20

Those phosphoric acid triesters having one to ten alkoxylate repeating units are preferred.

The production of the composite elements according to the invention may take place by reacting components a), b) and optionally c), d) and e) in the presence of a thermoplastic polymer layer (i).

To produce the PU products, the compound (a) and the compounds (b) that are reactive towards isocyanates, and optionally (d), are reacted in quantities such that the equivalent ratio of NCO groups of (a) to the sum of the reactive hydrogen atoms of (b) and optionally (d) is preferably 0.3 to 1.8:1, more preferably 0.4 to 1.0:1 and most preferably 0.4 to 0.6:1. If the product (ii) contains at least some bound isocyanurate groups, it is usual to employ a ratio of NCO groups to the sum of the reactive hydrogen atoms of 1.5 to 60:1, more preferably 1.5 to 8:1.

The reaction to form the product can be performed e.g. by manual mixing, by high-pressure or low-pressure machines or by RIM (reaction injection molding) processes, generally in open or preferably closed molds. Suitable processing machines are commercially available (e.g. from Elastogran, Hennecke, Krauss Maffei and others).

For the production of solid products as (ii), it has proven advantageous if the components for the production of solid polyisocyanate polyaddition products are degassed by applying a vacuum before being processed to obtain bubble-free moldings. For processing with polyurethane (PU) machines, it is also advantageous if the feed tanks are under reduced pressure during processing.

The starting components are preferably mixed at a temperature of 0 to 100° C., more preferably 20 to 80° C., depending on the application, and introduced into the mold, for example. As already explained, the mixing can be performed mechanically using a stirrer or a paddle screw, or can take place in a conventional high-pressure mixing head.

The reaction of the reaction mixture can be carried out e.g. in conventional molds, which are preferably capable of being temperature-controlled and sealed. Particularly in the production of products that are as smooth as possible, those molds having a surface that is as smooth as possible or having defined patterns, and preferably no surface irregularities, cracks, scratches or impurities, are preferably used as molds. The surface of the mold can be treated e.g. by polishing.

Conventional and commercially available molds, the surface of which may be e.g. steel, aluminium, enamel, polytetrafluoroethylene (TEFLON), epoxy resin or another polymeric material, can be used as molds for the production of the composite elements, the surface optionally being chrome plated, e.g. hard chrome plated. The molds should preferably be capable of being temperature-controlled to enable the preferred temperatures to be set, sealable and preferably suitably equipped to exert a pressure on the product.

The conversion to the polyisocyanate polyaddition products preferably takes place at a mold temperature (this can preferably also be the temperature of the starting components) of 20 to 120° C., more preferably 25 to 100° C., most preferably 25 to 40° C., for a period of preferably 0.5 to 30 min, more preferably 1 to 5 min. The reaction in the mold takes place according to the invention in direct contact with (i). This can be achieved e.g. in that before the reaction, (i) is placed in the mold, preferably free of folds if (i) is a film, and then, as already described, the reaction mixture is fed into the mold on to (i) and then the mold is preferably sealed. Fibers as component (e) of the reaction mixture can be used both in the reaction mixture and in the form of mats or fabrics. If mats or fabrics are used as component (e), these can, for example, be placed in the mold on (i) before feeding in the reaction mixture, and then the reaction mixture, which in this case does not have to contain any fibers (e) in addition to the mats or fabrics, is fed into the mold.

Known (cyclo)aliphatic and/or especially aromatic polyisocyanates, preferably diisocyanates, can be used as the isocyanates. To produce the composite elements according to the invention, aromatic diisocyanates are particularly suitable, preferably diphenylmethane diisocyanate (MDI) and toluene diisocyanate (TDI).

As compounds that are reactive towards isocyanates, the known compounds can be used, e.g. polyether polyalcohols, polyester polyalcohols and/or polycarbonate diols, preferably polyether polyols and/or polyester polyalcohols, which preferably have a molecular weight of 500 to 10000, more preferably 1000 to 6000 and preferably a functionality with respect to isocyanate groups of 2 to 6. Furthermore, the compounds can be used in a mixture with chain-extending and/or crosslinking agents. The chain-extending agents are predominantly 2-functional alcohols with molecular weights of 60 to 499, e.g. ethylene glycol, propylene glycol, 1,4-butanediol, 1,5-pentanediol. The crosslinking agents are compounds with molecular weights of 60 to 499 and 3 or more active hydrogen atoms, preferably amines and particularly preferably alcohols, e.g. glycerin, trimethylolpropane and/or pentaerythritol.

As catalysts (c), conventional compounds that strongly accelerate the reaction of component (a) with component (b), for example, can be used. Tertiary amines and/or organometallic compounds that are generally known for this purpose, especially tin compounds, are suitable, for example. Those catalysts leading to the lowest possible fogging, i.e. to the lowest possible emission of volatile compounds from the reaction product (ii), are preferably used as catalysts, e.g. potassium acetate and/or lithium salts and/or tertiary amines with at least one functional hydroxyl group.

For the production of foamed products (ii), such as e.g. polyurethane flexible, semi-rigid or rigid foams, which can optionally have urea and/or isocyanurate structures, generally known compounds having a chemical or physical action can be used as blowing agents (d), water, which forms carbon dioxide by reaction with the isocyanate groups, can preferably be used as a blowing agent having a chemical action. Examples of physical blowing agents, i.e. those inert compounds that evaporate under the conditions of polyurethane formation, are e.g. (cyclo)aliphatic hydrocarbons, preferably those with 4 to 8, more preferably 4 to 6 and most preferably 5 carbon atoms, partially halogenated hydrocarbons or ethers, ketones or acetates. The quantity of blowing agents used depends on the desired density of the foams. The different blowing agents can be used individually or in any mixtures with one another.

The reaction optionally takes place in the presence of (e) auxiliary substances and/or additives, such as e.g. fillers, fibers, e.g. in the form of fabrics and/or mats, cell regulators, surface-active compounds and/or stabilizers against oxidation, thermal or microbial degradation or ageing.

The use of prepolymers obtainable from the reaction of at least one isocyanate and a phosphoric acid triester having a hydroxyl number of 40 to 700 mg KOH/g is preferred, the prepolymer having an isocyanate group content of 5 to 45%. By using the phosphoric acid triesters in the prepolymer, these are integrated in the isocyanate component in a stable manner. No flocculation or precipitation whatsoever of the phosphoric acid triesters, e.g. in the polyol component, can therefore occur.

However, the phosphoric acid triesters can also be used in the "polyol component". This variant also provides stable polyurethane systems. No flocculation or precipitation of the phosphoric acid triesters occurs.

Owing to the use of the phosphoric acid triesters described at the beginning, the composite elements according to the invention exhibit markedly improved adhesion between (i) and (ii), i.e. adhesion to the thermoplastic support material, especially to support material made of PC/ABS and SMA. This improved adhesion guarantees that, when attempting to tear the foam off the support, the foam remains on the support over its entire surface. By using the phosphoric acid triesters, it was possible to achieve an adhesion between (i) and (ii), as measured according to DIN 53 357 A in the initial state and after storage in warm and in warm, humid conditions, reaching a peel force of ≧2.5 N/cm. This also applies particularly after prolonged humid ageing and stressing by the double alternating climatic test and the blooming test.

The composite elements according to the invention are preferably used as components in vehicle, aircraft or property construction, e.g. as instrument panels, door trims, parcel shelves, consoles, arm rests or door mirrors.

The invention will be explained in more detail on the basis of the following examples.

EXAMPLES

Description of the Starting Substances

Polyol 1: Polyether polyol with an OH number of 35 and at least 80% primary OH groups, produced by addition of propylene oxide/ethylene oxide (82/18) to glycerin as initiator.

Polyol 2: Polyether polyol with an OH number of 28 and at least 80% primary OH groups, produced by addition of propylene/ethylene oxide (82/18) to glycerin as initiator and with a grafted filler content of 20 wt. % of styrene/acrylonitrile (40%/60%).

Phosphoric Acid Ester 1:
3.36 mol propylene oxide are added to 1 mol dibutyl phosphate; OH number: 138.4 mg KOH/g.

Phosphoric Acid Ester 2:
1.80 mol propylene oxide are added to 1 mol bis(2-ethylhexyl)phosphate; OH number: 131.0 mg KOH/g.

Polyisocyanate 1:
Polyisocyanate from the diphenylmethane series, obtained by phosgenation of an aniline/formaldehyde condensate, with an isocyanate content of 31.5 wt. % and a viscosity of 200 mPa·s at 25° C.

Polyisocyanate 2:
640 g 4,4'-diisocyanatodiphenylmethane
80 g 2,4'-diisocyanatodiphenylmethane
112 g polyisocyanate 1
NCO content: 32.4%

Polyisocyanate Prepolymer 1:
576 g 4,4'-diisocyanatodiphenylmethane
72 g 2,4'-diisocyanatodiphenylmethane
72 g polyisocyanate 1
100 g phosphoric acid ester 1
are heated to 95° C. for 2 hours.
NCO content: 27.5%
Viscosity: 75 mPa·s at 25° C.

Polyisocyanate Prepolymer 2:
256 g 4,4'-diisocyanatodiphenylmethane
32 g 2,4'-diisocyanatodiphenylmethane
112 g polyisocyanate 1
100 g phosphoric acid ester 1
are heated to 95° C. for 2 hours.
NCO content: 22.8%
Viscosity: 165 mPa·s at 25° C.

Polyisocyanate Prepolymer 3:
256 g 4,4'-diisocyanatodiphenylmethane
32 g 2,4'-diisocyanatodiphenylmethane
112 g polyisocyanate 1
100 g phosphoric acid ester 2
are heated to 95° C. for 2 hours.
NCO content: 23.2%
Viscosity: 134 mPa·s at 25° C.

Foaming Examples

Polyurethane molded foams were produced with the formulations given below in Table I. For this purpose, polyol, water and activator were pre-mixed. The isocyanate was added, the reaction mixture was homogenized for 10 seconds at 1200 rpm and poured into a sheet mold at a temperature of 40° C. (size 200*200*20 mm), on the base of which a 100× 150 mm thermally injection-molded sheet of the polycarbonate/ABS-based PULSE 630 GF type from DOW, Schwalbach, with a thickness of 3 mm, had previously been centrally fixed.

TABLE I

|  | Example | | | |
| --- | --- | --- | --- | --- |
|  | 1 | 2 | 3 | 4* |
| Polyol 1 | 67.96 | 67.46 | 57.95 | 67.96 |
| Polyol 2 | 27.79 | 27.79 | 27.8 | 27.74 |

TABLE I-continued

| | Example | | | |
|---|---|---|---|---|
| | 1 | 2 | 3 | 4* |
| Phosphoric acid ester 2 | — | — | 10.0 | — |
| Diethanolamine | 1.11 | 1.11 | 1.11 | 1.11 |
| Black paste N (ISL Chemie) | 0.51 | 0.51 | 0.51 | 0.51 |
| Water | 1.8 | 1.8 | 1.8 | 1.8 |
| JEFFCAT ZF 10 (Huntsman ICI) | 0.33 | 0.33 | 0.33 | 0.33 |
| Dimethylaminopropyl urea 70% in dipropylene glycol | 0.5 | 0.5 | 0.5 | 0.5 |
| Stabiliser B 8715 (Goldschmidt) | — | — | 0.5 | — |
| Polyisocyanate 2 | — | — | 40.0 | 36.0 |
| Polyisocyanate prepolymer 2 | 51.1 | — | — | — |
| Polyisocyanate prepolymer 3 | — | 50.2 | — | — |
| Cream time [s] | 14 | 14 | 12 | 11 |
| Rise time [s] | 92 | 92 | 75 | 81 |
| Density [kg/m$^3$], free expansion | 82 | 82 | 68 | 68 |
| Density [kg/m$^3$], mold | 150 | 150 | 150 | 150 |

*Comparison
Mix ratio: 100 parts by weight of polyol formulation (polyols, water, additives) to the quantity of isocyanate given in the table.

The quantities given in the table are parts by weight.

Investigation into the Adhesion Between Foam and Thermoplastic

The test pieces were subjected to the humid ageing tests after 24 hours' storage at RT.

A) Alternating Climatic Test (KWT)

Test Conditions:

| | |
|---|---|
| 1. Rate of temperature change | min 1 K/min |
| 2. Steady period at temperature limit | 4 hours |
| 3. Temperature limits | +80° C. and −40° C. |
| 4. Relative humidity at +80° C. | 80% |

5. Test Procedure:

During a cycle, the test piece is heated from room temperature ("RT") to 80° C., held at 80° C. for 4 hours, cooled to −40° C., held at −40° C. for 4 hours and heated to RT (cycle time: 12 hours).

In the test series, the test pieces were stressed for a total of 288 hours in the form of 24 cycles of 12 hours test duration (double KWT).

B) Blooming Test

Storage of Test Pieces Under the Following Conditions:

| | |
|---|---|
| Duration: | 500 hours |
| Temperature: | 70° C. |
| Humidity: | 85% |

Results of the Double Alternating Climatic Test (KWT) and the Blooming Test:

| Test/adhesion | Double KWT | Blooming test |
|---|---|---|
| Composite 1 | 2-3 | 3 |
| Composite 2 | 2-3 | 3 |
| Composite 3 | 2-3 | 3 |
| Composite 4* | 5 | 5 |

*test not according to the invention

Adhesion Criteria:

| | |
|---|---|
| Evaluation: | 1 = very good |
| | 2 = good (difficult to scratch off/can be partly scratched off) |
| | 3 = OK (can be scratched off with fingernail) |
| | 4 = poor (partially uncoated) |
| | 5 = no adhesion (totally uncoated) |

The composite elements according to the invention display good to acceptable adhesion between the polyurethane and the thermoplastic support after a double KWT (288 hours total duration) and therefore meet the requirements of a long-term test.

Similar findings were made in the blooming test with a total duration of 500 hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composite element comprising, as a layer,
   i) at least one thermoplastic polymer, adhering to which, as a layer,
   ii) the product of the reaction of a reaction mixture comprising
      a) an isocyanate selected from the group consisting of
         (i) prepolymers containing isocyanate groups obtained from the reaction of at least one isocyanate and at least one phosphoric acid triester, in which at least one of the three ester groups is a hydroxyfunctional alkoxylate, the prepolymer having an isocyanate group content of about 5 to about 45%, and
         (ii) organic diisocyanates,
      b) in the case of a) (i) compounds reactive towards isocyanates or in the case of a) (ii) a mixture of compounds reactive towards isocyanates and at least one phosphoric acid triester in which at least one of the three ester groups is a hydroxyfunctional alkoxylate, and
   optionally one or more of
      c) catalysts
      d) blowing agents
      e) auxiliary substances and/or additives
   is attached,
   wherein the composite has a peel force of adhesion between layers i) and ii) greater than or equal to 2.5 N/cm, as measured according to DIN 53 357 A, after storage in warm and humid conditions.

2. A process for the production of the composite element according to claim 1, containing a thermoplastic polymer layer (i) and, adhering thereto, a layer (ii) of polyisocyanate polyaddition products, wherein
   a) an isocyanate selected from the group consisting of
      (i) prepolymers containing isocyanate groups obtained from the reaction of at least one isocyanate and at least one phosphoric acid triester, in which at least one of the three ester groups is a hydroxyfunctional alkoxylate, the prepolymer having an isocyanate group content of about 5 to about 45%, and
      (ii) organic diisocyanates,
   b) in the case of a) (i) compounds reactive towards isocyanates or in the case of a) (ii) a mixture of compounds reactive towards isocyanates and at least one phosphoric acid triester in which at least one of the three ester groups is a hydroxyfunctional alkoxylate, and optionally one or more of c) catalysts, d) blowing agents e) auxiliary substances and/or additives are reacted in the presence of the layer (i).

3. In a process for the production of components in vehicle, aircraft and property construction, the improvement comprising including the composite element according to claim 1.

4. In a process for the production of components in vehicle, aircraft and property construction, the improvement comprising including the composite element made according to claim 2.

5. The composite element according to claim 1, wherein the at least one thermoplastic polymer is selected from the group consisting of polyphenylene oxide (PPO), polyvinyl chloride (PVC), styrene maleic anhydride (SMA), acrylonitrile-butadiene-styrene-acrylate (ASA), polycarbonate (PC), thermoplastic polyurethane (TPU), polyethylene, polypropylene, thermoplastic polyolefin (TPO) and polycarbonate/styrene-acrylonitrile-butadiene (PC/ABS blend).

6. The composite element according to claim 1, wherein layer (i) has a thickness of about 0.2 to about 5 mm.

7. The composite element according to claim 1, wherein layer (i) has a thickness of about 0.2 to about 3 mm.

8. The composite element according to claim 1 further including an additional layer iii) of a thermoplastic polymer, which is attached to the layer ii).

9. The composite element according to claim 8, wherein the thermoplastic polymer of layer iii) is selected from the group consisting of polyvinyl chloride (PVC), acrylonitrile-butadiene-styrene-acrylate (ASA), styrene maleic anhydride (SMA), thermoplastic polyurethane (TPU), polyethylene, polypropylene, polycarbonate/styrene-acrylonitrile-butadiene (PC/ABS) and thermoplastic polyolefin (TPO).

10. The process according to claim 2, wherein the at least one thermoplastic polymer is selected from the group consisting of polyphenylene oxide (PPO), polyvinyl chloride (PVC), styrene maleic anhydride (SMA), acrylonitrile-butadiene-styrene-acrylate (ASA), polycarbonate (PC), thermoplastic polyurethane (TPU), polyethylene, polypropylene, thermoplastic polyolefin (TPO) and polycarbonate/styrene-acrylonitrile-butadiene (PC/ABS blend).

11. The process according to claim 2, wherein layer (i) has a thickness of about 0.2 to about 5 mm.

12. The process according to claim 2, wherein layer (i) has a thickness of about 0.2 to about 3 mm.

13. The process according to claim 2 further including an additional layer iii) of a thermoplastic polymer, which is attached to the layer ii).

14. The process according to claim 13, wherein the thermoplastic polymer of layer iii) is selected from the group consisting of polyvinyl chloride (PVC), acrylonitrile-butadiene-styrene-acrylate (ASA), styrene maleic anhydride (SMA), thermoplastic polyurethane (TPU), polyethylene, polypropylene, polycarbonate/styrene-acrylonitrile-butadiene (PC/ABS) and thermoplastic polyolefin (TPO).

15. The composite element according to claim 1, wherein the peel force of adhesion is greater than or equal to 2.5 N/cm after prolonged humid ageing and stressing under the double alternating climatic test and the blooming test.

\* \* \* \* \*